(12) United States Patent
Kim et al.

(10) Patent No.: US 11,487,148 B2
(45) Date of Patent: *Nov. 1, 2022

(54) POLARIZING PLATE HAVING SPECIFIED RATIO OF POLARIZING FILM SHRINKAGE FORCE TO PROTECTIVE FILM SHRINKAGE FORCE

(71) Applicant: SHANJIN OPTOELECTRONICS (SUZHOU) CO., LTD., Zhangjiagang (CN)

(72) Inventors: Gae Sung Kim, Daejeon (KR); Eung Ki Lee, Daejeon (KR); Young Gon Kim, Daejeon (KR); Hyun Soo Lee, Daejeon (KR); Yoo Bin Kim, Daejeon (KR); Keon Woo Kim, Daejeon (KR); Young Tae Kim, Daejeon (KR)

(73) Assignee: SHANJIN OPTOELECTRONICS (SUZHOU) CO., LTD., Jiangsu (CN)

( * ) Notice: Subject to any disclaimer, the term of this patent is extended or adjusted under 35 U.S.C. 154(b) by 305 days.

This patent is subject to a terminal disclaimer.

(21) Appl. No.: 16/630,367

(22) PCT Filed: Jul. 16, 2018

(86) PCT No.: PCT/KR2018/008014
§ 371 (c)(1),
(2) Date: Jan. 10, 2020

(87) PCT Pub. No.: WO2019/013599
PCT Pub. Date: Jan. 17, 2019

(65) Prior Publication Data
US 2020/0166682 A1  May 28, 2020

(30) Foreign Application Priority Data
Jul. 14, 2017 (KR) .................. KR10-2017-0089485

(51) Int. Cl.
*G02B 1/14* (2015.01)
*G02B 5/30* (2006.01)
(Continued)

(52) U.S. Cl.
CPC .......... *G02F 1/133528* (2013.01); *C09J 7/38* (2018.01); *G02B 1/14* (2015.01); *G02B 5/3041* (2013.01);
(Continued)

(58) Field of Classification Search
CPC .............. G02B 1/14; G02B 5/30–3091; G02B 27/28–288; G02F 1/133528–13355; G02F 1/13362
See application file for complete search history.

(56) References Cited

U.S. PATENT DOCUMENTS 8,609,236 B2    12/2013   Ikeda et al.
9,645,438 B2     5/2017   Sekiguchi et al.
(Continued)

FOREIGN PATENT DOCUMENTS

CN    1334557 A    2/2002
CN  104937458 A    9/2015
(Continued)

*Primary Examiner* — Ryan S Dunning
(74) *Attorney, Agent, or Firm* — Schmeiser, Olsen & Watts, LLP (57) ABSTRACT

The present application relates to a polarizing plate having a polarizing film in which a light absorption axis is formed in one in-plane direction; a protective film formed on one side of the polarizing film; and a pressure-sensitive adhesive layer formed on the other side of the polarizing film, where the total thickness is 200 μm or less, and a ratio of ($S_{Pro}$/$S_{PVA}$) of a shrinkage force ($S_{PVA}$) of the polarizing film in the in-plane direction parallel to the light absorption axis direction and a shrinkage force ($S_{Pro}$) of the protective film in the in-plane direction perpendicular to the light absorption axis (Continued)

direction is in a range of 0.1 to 5. The present application can provide a polarizing plate which does not cause cracks or the like while having a thin thickness, does not induce warping or twisting in itself and does not induce the above problems even when applied to a display device such as an LCD or OLED.

13 Claims, 2 Drawing Sheets

(51) Int. Cl.
    *G02F 1/1335*    (2006.01)
    *C09J 7/38*    (2018.01)

(52) U.S. Cl.
    CPC .... *G02F 2201/501* (2013.01); *G02F 2201/54* (2013.01)

(56) References Cited

U.S. PATENT DOCUMENTS

| | | | |
|---|---|---|---|
| 9,946,110 B2 | 4/2018 | Yonemoto et al. | |
| 10,274,646 B2 | 4/2019 | Park et al. | |
| 2007/0182898 A1 | 8/2007 | Yamaoka et al. | |
| 2015/0276992 A1* | 10/2015 | Park | G02B 5/3041 |
| | | | 428/212 |
| 2016/0018578 A1 | 1/2016 | Yonemoto et al. | |
| 2016/0085006 A1* | 3/2016 | Akizuki | C08G 18/6229 |
| | | | 428/216 |
| 2016/0313475 A1 | 10/2016 | Kunai | |
| 2021/0356640 A1* | 11/2021 | Kim | G02B 5/30 |

FOREIGN PATENT DOCUMENTS

| | | |
|---|---|---|
| CN | 106164755 A | 11/2016 |
| CN | 106324741 A | 1/2017 |
| CN | 106461843 A | 2/2017 |
| EP | 2881772 A1 | 6/2015 |
| JP | H11-326640 A | 11/1999 |
| JP | 2013072951 A | 4/2013 |
| JP | 2014006505 A | 1/2014 |
| JP | 2014-219438 A | 11/2014 |
| JP | 2016504632 A | 2/2016 |
| KR | 10-2001-0113559 A1 | 12/2001 |
| KR | 20110108297 A | 11/2011 |
| KR | 20130063349 A | 6/2013 |
| KR | 10-2014-0089623 A | 7/2014 |
| KR | 10-2014-0094092 A | 7/2014 |
| KR | 10-2014-0146898 A | 12/2014 |
| KR | 20140140770 A | 12/2014 |
| KR | 10-2015-0055013 A | 5/2015 |
| KR | 10-2015-0072993 A | 6/2015 |
| KR | 10-2015-0113666 A | 10/2015 |
| KR | 10-2016-0021859 A | 2/2016 |
| KR | 101700467 B1 | 1/2017 |
| KR | 10-2017-0012280 A | 2/2017 |
| KR | 20180014798 A | 2/2018 |
| TW | 200815548 A | 4/2008 |
| TW | 201428332 A | 7/2014 |
| TW | 201601895 A | 1/2016 |
| TW | 201641998 A | 12/2016 |
| WO | 2006/018984 A1 | 2/2006 |
| WO | 2014/171480 A1 | 10/2014 |
| WO | 2015133356 A1 | 9/2015 |

\* cited by examiner

POLARIZING PLATE HAVING SPECIFIED RATIO OF POLARIZING FILM SHRINKAGE FORCE TO PROTECTIVE FILM SHRINKAGE FORCE

CROSS-REFERENCE TO RELATED APPLICATIONS

This application is a National Stage Application of International Application No. PCT/KR2018/008014, filed on Jul. 16, 2018, which claims the benefit of priority based on Korean Patent Application No. 10-2017-0089485 filed on Jul. 14, 2017, the disclosures of which are incorporated herein by reference in their entirety.

TECHNICAL FIELD

The present application relates to a polarizing plate.

BACKGROUND ART

The polarizing plate is applied to various display devices including an LCD (liquid crystal display) or an OLED (organic light emitting device) and the like to serve to control the state of the light.

Generally, the polarizing plate has a polarizing film having a polarizing function and a structure in which a protective film is attached to both sides of the polarizing film with an adhesive.

There is an attempt to provide a polarizing plate as thin as possible while a display device such as an LCD or an OLED is applied to a mobile device such as a cellular phone or a navigation device.

For example, Patent Document 1 discloses a polarizing plate to which at least one protective film is not applied.

PRIOR ART DOCUMENTS

Patent Documents (Patent Document 1) Korean Patent No. 1700467

Technical Problem

If a thin polarizing plate is implemented by a method of omitting the use of a protective film as in Patent Document 1 or the like, cracks or the like may be generated in the polarizing plate due to the asymmetric structure or the like, and problems such as warping and twisting may occur. It is one object of the present application to provide a polarizing plate which does not cause cracks or the like while having a thin thickness, does not induce warping or twisting in itself and does not induce the above problems even when applied to a display device such as an LCD or OLED.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, an error within about ±10 degrees or an error within about ±5 degrees.

Among physical properties mentioned in this specification, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

This specification relates to a polarizing plate. In this specification, the terms polarizing film and polarizing plate have different meanings. The term polarizing film means a functional element itself exhibiting a polarizing function, such as, for example, a PVA (poly(vinyl alcohol))-based film in which an anisotropic substance such as iodine is adsorbed and oriented, and the polarizing plate means an element comprising other elements together with the polarizing film. Here, other elements included together with the polarizing film can be exemplified by a polarizing film protective film, a viewing angle compensating film, a hard coating layer, a phase difference film, an adhesive layer, a pressure-sensitive adhesive layer or a low reflection layer, and the like, but is not limited thereto.

The polarizing plate of the present application has a total thickness of 200 μm or less. That is, the polarizing plate may comprise various elements as described above, but the final thickness is limited within the above range. When the thickness of the polarizing plate exceeds 200 μm, it is difficult to effectively cope with various applications in which a thin thickness is required. On the other hand, a polarizing plate usually has a pressure-sensitive adhesive layer for applying the polarizing plate to a display device, where to protect the pressure-sensitive adhesive layer, a release film may be attached to the pressure-sensitive adhesive layer or a releasable surface protective sheet may be temporarily attached to the outermost side of the polarizing plate. The thickness of 200 μm or less referred to in the present application is the thickness excluding the portions to be removed when the polarizing plate is finally applied to the display, such as the release film or the surface protective sheet. In another example, the thickness may be about 195 μm or less, about 190 μm or less, about 185 μm or less, about 180 μm or less, about 175 μm or less, about 170 μm or less, about 165 μm or less, about 160 μm or less, about 155 μm or less, about 150 μm or less, about 145 μm or less, or about 140 μm or less or so. The lower limit of the thickness of the polarizing plate is not particularly limited, but it may generally be about 50 μm or more, 60 μm or more, 70 μm or more, 80 μm or more, 90 μm or more, 100 μm or more, 110 or more, or 120 μm or more or so.

The thickness referred to herein may mean the shortest distance, the maximum distance or the average distance connecting the major surface of the target article to the main back, where there may also be manufacturing errors or deviations of a certain portion.

Figure 1:
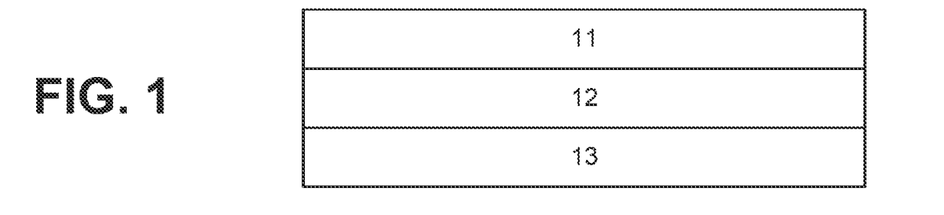
FIG. 1 shows an exemplary polarizing plate structure of the present application.

The polarizing plate may basically comprise a polarizing film, a protective film and a pressure-sensitive adhesive layer. The above structures may be arranged in the order of a protective film, a polarizing film and a pressure-sensitive adhesive layer. FIG. 1 schematically shows such a structure. As in FIG. 1, the polarizing plate may comprise a protective film (11) formed on one side of the polarizing film (12) and a pressure-sensitive adhesive layer (13) formed on the other side of the polarizing film (12).

As the polarizing film in the present application, a polarizing film in which a light absorption axis is formed along one direction in the plane can be used. Such polarizing films are variously known. In one example, as the polarizing film, a poly(vinyl alcohol) (hereinafter, PVA)-based polarizing film, which is a typical linear absorption polarizing film, can be used. Such a polarizing film usually comprises a PVA film and an anisotropic absorbent material adsorbed and oriented on the PVA film. As the anisotropic absorbent material, various dichroic dyes may be used, and iodine-based materials may be typically used. Such a polarizing film is generally referred to as an iodine-based absorbent linear PVA polarizing film.

For example, the PVA-based polarizing plate may be produced by subjecting a PVA-based film to various treatments such as swelling, dyeing, cross-linking and stretching, followed by cleaning and drying processes. As described below, the polarizing film can adjust shrinkage force to a predetermined range, where the shrinkage force can be controlled by adjusting the process conditions in any of the processes. In general, the shrinkage force may be influenced by draw ratios or the like during the stretching process of the processes. That is, when the draw ratio is high, the shrinkage force may be high, and when the draw ratio is low, it may be low. However, this method corresponds to one direction in which the shrinkage force can be controlled, and those skilled in the field of manufacturing the polarizing film can easily produce a polarizing film having a desired shrinkage force according to the purpose.

The polarizing film of the present application is the iodine-base absorption linear PVA polarizing film, which may comprise a PVA-based film and an anisotropic absorbent material adsorbed and oriented on the PVA-based film.

As the PVA-based film, for example, a general PVA-based film used in the conventional polarizing film may be used. A material of such a PVA-based film may include PVA or a derivative thereof. The derivative of PVA may include polyvinylformal or polyvinyl acetal, and the like, and may also include those modified by olefins such as ethylene or propylene, unsaturated carboxylic acids such as acrylic acid, methacrylic acid or crotonic acid and alkyl esters thereof or acrylamide, and the like. The PVA has a polymerization degree of about 100 to 10000 or about 1000 to 10000, and a saponification degree of about 80 to 100 mol %, but is not limited thereto.

The PVA-based film can also be exemplified by a hydrophilic polymer film such as a partially saponified film of ethylene-vinyl acetate copolymer series, a polyene-based oriented film such as a dehydrated product of PVA or a dehydrochlorinated product of polyvinyl chloride, and the like.

The PVA-based film may contain an additive such as a plasticizer or a surfactant. The plasticizer may be exemplified by polyol and a condensate thereof, and for example, may be exemplified by glycerin, diglycerin, triglycerin, ethylene glycol, propylene glycol or polyethylene glycol, and the like. When such a plasticizer is used, the ratio thereof is not particularly limited and may be generally about 20 wt % or less in the PVA-based film.

The kind of the anisotropic absorbent material that can be included in the polarizing film is also not particularly limited. In the present application, among the known anisotropic absorbent materials, those capable of satisfying the above-described optical characteristics can be appropriately selected. An example of the anisotropic absorbent material can be exemplified by iodine. The ratio of the anisotropic absorbent material in the polarizing film is also not particularly limited as long as it can satisfy the desired physical properties.

The polarizing film can be produced, for example, by performing at least dyeing, cross-linking and stretching processes on the PVA-based film.

In the dyeing process, an anisotropic absorbent material such as iodine can be adsorbed and/or oriented on the PVA-based film. Such a dyeing process can be performed together with the stretching process. The dyeing can generally be carried out by immersing the film in a solution containing an anisotropic absorbent material, for example, an iodine solution. As the iodine solution, for example, an aqueous solution in which iodine ions are contained by iodine and an iodinated compound as a solubilizing agent may be used. Here, as the iodinated compound, for example, potassium iodide, lithium iodide, sodium iodide, zinc iodide, aluminum iodide, lead iodide, copper iodide, barium iodide, calcium iodide, tin iodide or titanium iodide, and the like can be used. The concentrations of iodine and/or iodide ions in the iodine solution can be controlled within a conventional range according to the purpose. In the dyeing process, the temperature of the iodine solution is usually 20 to 50° C. or 25 to 40° C. or so, and the immersion time is usually 10 to 300 seconds or 20 to 240 seconds or so, without being limited thereto.

The cross-linking process carried out in the production procedure of the polarizing film can be carried out, for example, using a cross-linking agent such as a boron compound. The order of the cross-linking process is not particularly limited, and the process can be performed, for example, with the dyeing and/or stretching processes, or can proceed separately. The cross-linking process may also be carried out several times. As the boron compound, boric acid or borax may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the cross-linking degree and the heat resistance thereof. An iodinated compound such as potassium iodide can be contained in an aqueous solution of boric acid or the like.

The treatment temperature of the cross-linking process is usually in a range of 25° C. or higher, 30° C. to 85° C. or 30° C. to 60° C., and the treatment time is usually 5 seconds to 800 seconds or 8 seconds to 500 seconds or so, without being limited thereto.

The stretching process is generally performed by uniaxial stretching. Such stretching may also be performed together with the dyeing and/or cross-linking processes. The stretching method is not particularly limited, and for example, a wet stretching method can be applied. In such a wet stretching method, for example, stretching after dyeing is generally carried out, but stretching may be carried out together with cross-linking, and may be carried out several times or in multiple stages.

The iodinated compound such as potassium iodide can be contained in the treatment liquid applied to the wet stretching method. In the stretching, the treatment temperature is usually in the range of 25° C. or higher, 30° C. to 85° C., or 50° C. to 70° C. or so, and the treatment time is usually 10 seconds to 800 seconds or 30 seconds to 500 seconds, without being limited thereto.

The total draw ratio in the stretching processes can be controlled in consideration of the orientation characteristics and the like, and the total draw ratio may be about 3 to 10 times, 4 to 8 times, or 5 to 7 times or so based on the original length of the PVA-based film, but is not limited thereto. Here, in the case of involving the stretching even in the swelling process or the like other than the stretching process, the total draw ratio may mean the cumulative draw ratio including the stretching in each process. Such a total draw ratio can be adjusted to an appropriate range in consideration of orientation, workability or stretching cut possibility of the polarizing film, and the like. The shrinkage force can be controlled by controlling the draw ratio, as described above.

In the production process of the polarizing film, in addition to the dyeing, cross-linking and stretching, the swelling process may also be performed before the processes are performed. It is possible to clean contamination of the PVA-based film surface, or an antiblocking agent by swelling, and there is also an effect capable of reducing unevenness such as dyeing deviation by the swelling.

In the swelling process, water, distilled water or pure water, and the like can be usually used. The main component of the relevant treatment liquid is water, and if necessary, a small amount of an iodinated compound such as potassium iodide or an additive such as a surfactant, or alcohol, and the like can be included therein.

The treatment temperature in the swelling process is usually 20° C. to 45° C. or so, or 20° C. to 40° C. or so, but is not limited thereto. Since the swelling deviations can cause dyeing deviations, the process variables can be adjusted so that the occurrence of such swelling deviations is suppressed as much as possible. If necessary, the proper stretching may also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small and can control so that the stretching failure of the film does not occur.

In the production process of the polarizing film, a metal ion treatment can be performed. Such a treatment is carried out, for example, by immersing the PVA-based film in an aqueous solution containing a metal salt. This allows metal ions to be contained in the polarizer, and in this process, the color tone of the PVA-based polarizing film can also be adjusted by controlling the kind or ratio of the metal ions. As the metal ion that can be applied, metal ions of transition metals such as cobalt, nickel, zinc, chromium, aluminum, copper, manganese or iron can be exemplified, and the color tone can also be adjusted by selecting a proper kind among them.

In the production procedure of the polarizing film, the cleaning process may proceed after dyeing, cross-linking and stretching. Such a cleaning process may be performed by a solution of iodine compound such as potassium iodide, and may also be performed by using water.

This cleaning with water may also be combined with cleaning with the solution of an iodinated compound, where a solution in which liquid alcohols such as methanol, ethanol, isopropyl alcohol, butanol or propanol are blended may also be used.

After passing through such a process, the polarizing film can be produced by performing a drying process. In the drying process, for example, it may be performed at an appropriate temperature for a suitable time in consideration of the moisture content and the like required for the polarizing film, and such conditions are not particularly limited.

The thickness of the polarizing film applied in the present application may usually be within a range of about 5 µm to 25 µm. In another example, the thickness may be about 24 µm or less, 23 µm or less, 22 µm or less, 21 µm or less, 20 µm or less, 19 µm or less, 18 µm or less, or 17 µm or less, or may be about 6 µm or more, 7 µm or more, 8 µm or more, 9 µm or more, 10 µm or more, 11 µm or more, 12 µm or more, 13 µm or more, 14 µm or more, 15 µm or more, or 16 µm or more or so.

The polarizing film may have shrinkage force in one direction in the plane within a range of about 0.1 N to 15 N. One direction in the plane may be, for example, a direction in which the above-described light absorption axis is formed. The shrinkage force may be 14.5 N or less, 14 N or less, 13.5 N or less, 13 N or less, 12.5 N or less, 12 N or less, 11.5 N or less, 11 N or less, 10.5 N or less, 10 N or less, 10 N or less, 9.5 N or less, or 9 N or less, or may be 0.5 N or more, 1 N or more, 2 N or more, 3 N or more, 4 N or more, 5 N or more, 6 N or more, 7 N or more, or 8 N or more. The shrinkage force referred to herein is a value measured in the method shown in the examples.

The polarizing film having the shrinkage force as above can be applied by selecting the polarizing film having the shrinkage force among the available polarizing films or by controlling the process conditions such as the stretching conditions in the production procedure as described above.

As the protective film included in the polarizing plate, a known protective film may be used. Usually, a thermoplastic resin film having excellent transparency, mechanical strength, thermal stability, moisture barrier property or isotropy and the like is used. An example of such a resin can be exemplified by a cellulose resin such as TAC (triacetyl cellulose), a polyester resin such as PET (poly(ethylene terephthalate)), a polyether sulfone resin, a polysulfone resin, a polycarbonate resin, a polyamide resin, a polyimide resin, a polyolefin resin, a (meth)acrylic resin, a cyclic polyolefin resin such as a norbornene resin, a polyarylate resin, a polystyrene resin, a polyvinyl alcohol resin or a mixture thereof, and the like.

As the protective film applied in the present application, a protective film having a ratio (S1/A2) of the shrinkage force (S1) in a first direction in any plane to the shrinkage force (S2) in a second direction in the plane perpendicular to the first direction in a range of 0 to 20 may be used. In another example, the ratio (S1/S2) may be about 0.1 or more, about 0.15 or more, about 0.2 or more, about 0.3 or more, about 0.4 or more, about 0.5 or more, 1 or more, 2 or more, 3 or more, 4 or more, 5 or more, 6 or more, 7 or more, or 8 or more, or may be about 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, 4 or less, 3 or less, 2 or less, 1 or less, 0.5 or less, 0.25 or less, or 0.2 or less or so.

In one example, when the protective film is a stretched polymer film, the first direction may be any one of MD (machine direction) and TD (transverse direction) directions and the second direction may be the other of MD (machine direction) and TD (transverse direction) directions.

Here, the contracting force (S1) in the first direction may be, for example, about 0 N to 10 N or so. In another example, the shrinkage force (S1) may be about 0.5 N or more, or 1 N or more, or may be 9 N or less, 8 N or less, 7 N or less, 6 N or less, 5 N or less, 4 N or less, 3 N or less, 2 N or less, or 1.5 N or less or so.

On the other hand, the shrinkage force (S2) in the second direction may be, for example, about 1 N to 30 N or so. In another example, the shrinkage force (S1) may be about 1 N or more, 2 N or more, or 3 N or more, or may be 28 N or less, 26 N or less, 24 N or less, 22 N or less, 20 N or less, 18 N or less, 16 N or less, 14 N or less, 12 N or less, 10 N or less, 9 N or less, 8 N or less, 7 N or less, 6 N or less, 5 N or less, 4 N or less, 3 N or less, or 2 N or less or so.

A protective film having the above characteristics can be easily available. Usually, the polymer film used as a protective film is produced through a uniaxial and/or biaxial stretching process, where as in the case of the polarizing film, the desired shrinkage force can be secured by controlling the draw ratio in the stretching process.

That is, the protective film having the shrinkage force as above can be applied by selecting a film having the shrinkage force among the available films, or by controlling process conditions such as stretching conditions during the production procedure.

If the available protective film does not have the desired shrinkage force, there is a method of controlling the shrinkage force for further processing. Usually, the protective film can reduce the contractive force through heat treatment at a glass transition temperature (Tg) or higher of the relevant protective film. For example, the shrinkage force can be controlled by subjecting the protective film to heat treatment at a temperature from the glass transition temperature or higher of the relevant protective film to about 50° C. higher than the glass transition temperature (Tg+50° C.) or lower. In this case, the contracting force in the TD (transverse direction) direction is generally controlled rather than the so-called MD (machine direction) direction.

The upper limit of the heat treatment temperature may be Tg+45° C., Tg+40° C., Tg+35° C., Tg+30° C., Tg+25° C., Tg+20° C., Tg+15° C., Tg+10° C. or Tg+5° C. or so, where Tg is the glass transition temperature.

The heat treatment time can be adjusted in consideration of the target shrinkage force without particular limitation, which can be generally performed within a range of about 10 seconds to 1,000 seconds.

The thickness of the protective film applied in the present application may usually be in a range of about 20 μm to 250 μm. In another example, the thickness may be about 200 μm or less, 150 μm or less, or 100 μm or less, or may be about 30 μm or more, 40 μm or more, 50 μm or more, 60 μm or more, or 70 μm or more or so.

In general, a protective film such as a so-called PET (poly(ethylene terephthalate)) film among known protective films can satisfy physical properties such as the aforementioned shrinkage force well.

For example, a polyester film known as a so-called highly stretched PET (poly(ethylene terephthalate)) film or SRF (super retardation film) can be used as the protective film. Therefore, the protective film may be a polyester film.

The protective film used in the present application may have known functional layers such as an antiglare layer, a conductive layer, a hard coating layer, a smoothing layer, an antiblocking layer, a primer layer, and an antireflection layer.

The polarizing plate may comprise a pressure-sensitive adhesive layer, where such a pressure-sensitive adhesive layer may be present for attaching the polarizing plate to a display device such as an LCD or an OLED. The pressure-sensitive adhesive for forming the pressure-sensitive adhesive layer is not particularly limited, and for example, an acrylic polymer, a silicone-based polymer, polyester, polyurethane, polyamide, polyether or a polymer such as a fluorine series or a rubber series as a base polymer can be appropriately selected and used. As described above, with respect to the exposed surface of the pressure-sensitive adhesive layer, a release film may be temporarily attached thereto and covered for the purpose of preventing the contamination until the layer is provided for practical use.

The thickness of the pressure-sensitive adhesive layer may usually be in a range of 5 μm to 100 μm. In another example, the thickness may be about 10 μm or more, 15 μm or more, or 20 μm or more, or may be about 90 μm or less, 80 μm or less, 70 μm or less, 60 μm or less, 50 μm or less, 40 μm or less, or 30 μm or less.

In the polarizing plate of the present application comprising the elements as above, a ratio ($S_{Pro}/S_{PVA}$) of the shrinkage force ($S_{PVA}$) of the polarizing film in the in-plane direction parallel to the light absorption axis direction and the shrinkage force ($S_{Pro}$) of the protective film in the in-plane direction perpendicular to the light absorption axis direction may be in a range of about 0.1 to 5. In another example, the ratio may be about 0.2 or more, 0.3 or more, 0.4 or more, 0.45 or more, or 0.5 or more, or may be about 4.5 or less, 4 or less, 3.5 or less, 3 or less, 2.5 or less, 2 or less, 1.5 or less, 1 or less, 0.9 or less, 0.85 or less, 0.8 or less, or 0.75 or less or so.

In one example, the shrinkage force ($S_{Pro}$) of the protective film may be the shrinkage force (S1) in the first direction or the shrinkage force (S2) in the second direction.

Through the arrangement as above, the present application can provide a polarizing plate that has no problem of durability, or warping or twisting while being thin.

For example, the polarizing plate may have an A value in a range of 0.01 to 26 N·mm according to the following equation 1.

$$A = aX(S_{PVA} \times (T_1+b) + S_{Pro} \times (T_2+b))$$ [Equation 1]

In Equation 1, $S_{PVA}$ is the shrinkage force of the polarizing film in the light absorption axis direction, $S_{Pro}$ is large shrinkage force among the shrinkage force of the protective film in the direction parallel to the light absorption axis direction of the polarizing film and the shrinkage force of the protective film in the direction perpendicular to the light absorption direction, $T_1$ is a distance (unit: mm) from the lowermost portion of the pressure-sensitive adhesive layer to the center of the polarizing film, $T_2$ is a distance (unit: mm) from the lowermost portion of the pressure-sensitive adhesive layer to the center of the protective film, a is a number within a range of 0.5 to 2, and b is a number within a range of 0.14 to 0.6.

The A value in Equation 1 above reflects a bending property of the polarizing plate. IF the polarizing plate has the A value, even when the polarizing plate is formed thin, it is possible to provide a display device having excellent durability and optical characteristics without causing warping or twisting upon having been applied to a display device such as an LCD or an OLED.

In another example, the A value in Equation 1 above may be 0.05 N·mm or more, 0.1 N·mm or more, 0.15 N·mm or more, 0.2 N·mm or more, 0.25 N·mm or more, 0.3 N·mm or more, 0.4 N·mm or more, 0.45 N·mm or more, 0.5 N·mm or more, 0.55 N·mm or more, 0.6 N·mm or more, 0.65 N·mm or more, 0.7 N·mm or more, 0.75 N·mm or more, 0.8 N·mm or more, 0.85 N·mm or more, 0.9 N·mm or more, 0.95 N·mm or more, 0.1 N·mm or more, 0.5 N·mm or more, 1 N·mm or more, 1.5 N·mm or more, 2 N·mm or more, 2.5 N·mm or more, 3 N·mm or more, 3.5 N·mm or more, 4 N·mm or more, 4.5 N·mm or more, 5 N·mm or more, 5.5 N·mm or more, 6 N·mm or more, 6.5 N·mm or more, 7 N·mm or more, 7.5 N·mm or more, 8 N·mm or more, 8.5 N·mm or more, 9 N·mm or more, 9.5 N·mm or more, 10 N·mm or more, 11 N·mm or more, 12 N·mm or more, 13 N·mm or more, 14 N·mm or more, 15 N·mm or more, 16 N·mm or more, 17 N·mm or more, 18 N·mm or more, 19 N·mm or more, or 20 N·mm or more or so, or may be 25 N·mm or less, 24 N·mm or less, 23 N·mm or less, 22 N·mm or less, 21 N·mm or less, 20 N·mm or less, 19 N·mm or less, 18 N·mm or less, 17 N·mm or less, 16 N·mm or less, 15 N·mm or less, 14 N·mm or less, 13 N·mm or less, 12 N·mm or less, 11 N·mm or less, 10 N·mm or less, 9 N·mm or less, 8 N·mm or less, 7 N·mm or less, 6 N·mm or less, or 5 N·mm or less.

The A value may fall within the above-described numerical range in the entire range of a and/or b, as defined above, or may also fall within the above-described numerical range when any one value within the range of a and any one value within the range of b have been substituted.

In Equation 1 above, the a value may be a number in a range of 0.5 to 2. In another example, the a value may be about 0.55 or more, about 0.6 or more, about 0.65 or more, about 0.7 or more, about 0.75 or more, about 0.8 or more, about 0.85 or more, about 0.9 or more, about 1 or more, or about 1.5 or more, or may also be 1.9 or less, about 1.8 or less, about 1.7 or less, about 1.6 or less, about 1.5 or less, about 1.4 or less, about 1.3 or less, about 1.2 or less, about 1.1 or less, about 1.0 or less, about 0.95 or less, about 0.9 or less, about 0.85 or less, about 0.8 or less, about 0.75 or less, about 0.7 or less, or about 0.65 or less.

In Equation 1 above, the b value may be a number in a range of 0.14 to 0.6. In another example, the b value to be substituted in Equation 1 above may be 0.15 or more, or 0.2 or more, or may be 0.55 or less, 0.5 or less, 0.45 or less, 0.4 or less, 0.35 or less, or 0.3 or less. In one example, when the polarizing plate is applied to an LCD, the b value may be determined according to the thickness of the LCD panel, and for example, a half of the thickness (unit: mm) of the LCD panel may be the b value.

In addition, when the polarizing plate having the structure of the present application is applied to both surfaces of the LCD panel, the ratio (A1/A2) of the A value (A1) of the polarizing plate applied to one surface to the A value (A2) of the polarizing plate applied to the other surface may be in a range of 0.85 to 1.15.

In addition to the above-described elements, the polarizing plate of the present application as above may comprise other necessary structures as long as the entire thickness is within the desired range.

For example, the polarizing plate may further comprise an adhesive layer between the protective film and the polarizing film. Such an adhesive layer can be used for attaching the protective film to the polarizing film.

As the adhesive, for example, an adhesive layer used for attaching a polarizing film and a protective film in a conventional polarizing plate can be used.

The adhesive layer may comprise one or two or more of, for example, a polyvinyl alcohol-based adhesive; an acrylic adhesive; a vinyl acetate-based adhesive; a urethane-based adhesive; a polyester-based adhesive; a polyolefin-based adhesive; a polyvinyl alkyl ether-based adhesive; a rubber-based adhesive; a vinyl chloride-vinyl acetate-based adhesive; a styrene-butadiene-styrene (SBS) adhesive; a styrene-butadiene-styrene hydrogen adduct (SEBS)-based adhesive; an ethylenic adhesive; and an acrylic ester-based adhesive, and the like. Such an adhesive may be formed using, for example, an aqueous, solvent-based or solventless adhesive composition. In addition, the adhesive composition may be a thermosetting type, room temperature curing type, moisture curing type, active energy ray curing type or hybrid curing type adhesive composition.

A method for forming an adhesive layer on a polarizing film is not particularly limited, and for example, a method of applying an adhesive composition to a polarizing film and curing it, a droplet method, or the like can be used.

The thickness of such an adhesive layer can be, for example, in a range of about 1 μm to 5 μm or about 2 μm to 4 μm.

As a further constitution, the polarizing plate may further comprise a cured resin layer between the polarizing film and the pressure-sensitive adhesive layer. Such a cured resin layer is generally called a hard coating layer, and is generally applied instead of omitting any one of protective films in a polarizing plate. The kind of the cured resin layer that can be applied in the present application is not particularly limited, and various types of cured resin layers used for providing the thin polarizing plate can be applied. Usually, such a cured resin layer may comprise an epoxy resin, an oxetane resin, a urethane resin and/or an acrylic resin, and the like, and such a resin layer is variously known.

The thickness of this cured resin layer can be, for example, in a range of about 4 μm to 10 μm or about 4.5 μm to 10 μm.

Also, the polarizing plate of the present application may further comprise other known constitutions, for example, one or more functional layers selected from the group consisting of an antireflection layer, an antiglare layer, a retardation plate, a wide view angle compensation film, and/or a brightness enhancement film, as long as the desired thickness is not exceeded, as described above.

The present application also relates to a display device, and for example, relates to an LCD or OLED. The display device such as the LCD or the OLED may comprise the polarizing plate of the present application. The display device may comprise, for example, a display panel such as an LCD panel or an OLED panel and the polarizing plate of the present application attached to the display panel.

The type of the display panel applicable to the display device of the present application or the position of the polarizing plate attached to the panel, and the like is not particularly limited. That is, the display panel can be realized in various known manners as long as the polarizing plate of the present application is applied.

Advantageous Effects

The present application can provide a polarizing plate which does not cause cracks or the like while having a thin thickness, does not induce warping or twisting in itself and does not induce the above problems even when applied to a display device such as an LCD or OLED.

MODE FOR INVENTION

Hereinafter, the present application will be specifically described by way of Examples, but the scope of the present application is not limited by the following examples.

The term MD mentioned herein means the machine direction unless otherwise specified, and TD means the transverse direction unless otherwise specified.

1. Measurement of Shrinkage Force

The shrinkage force of the polarizing film or protective film mentioned herein was measured by the following method using a DMA instrument from TA. A specimen was produced to have a width of about 5.3 mm and a length of about 15 mm, and both ends of the specimen in the longitudinal direction were fixed to the clamp of the measuring instrument and then the contractile force was measured. Here, the length 15 mm of the specimen is the length excluding the portion to be fixed to the clamp. After fixing the specimen to the clamp as above, the specimen was pulled and fixed to maintain strain 0.1% in the state of preload 0N, and then the shrinkage force applied when the strain 0.1% was kept at the elevated temperature of the following temperature condition was measured.

As the results of the shrinkage force, values were measured 120 minutes after 80° C. stabilization of the following temperature condition.

<Measurement Temperature Condition and Time>
Temperature: 25° C. start→75° C. after 3 minutes→80 stabilization (no acceleration condition) after 7 minutes
Measurement time: 120 minutes Production Example 1. Production of PVA-Based Polarizing Film (A)

After a PVA (poly(vinyl alcohol)) film (Nippon Synthetic Chemical Co., Ltd., polymerization degree of about 3,000 or so) having a thickness of about 45 μm used for a polarizing film was swelled in a pure solution at a temperature ranging from about 20° C. to 30° C., a dyeing process was performed for about 10 seconds to 30 seconds in an iodine solution at a temperature of 30° C. to 40° C. or so. Thereafter, a cleaning process was performed for about 20 seconds with a boric acid solution (concentration: about 2 wt %) at a temperature of about 40° C., and then the film was stretched about 6 times in a boric acid solution at a temperature of 50° C. to 60° C. and a concentration of about 4.0 wt %, and after stretching, a complementary color process was performed in a KI solution at a concentration of about 2 to 4 wt % and dried to produce a polarizing film having a thickness of about 17 μm. As a result of measuring the shrinkage force (hereinafter, MD shrinkage force) of the produced PVA-based polarizing film in the light absorption axis direction, it was about 8 to 10 N.

Production Examples 2 to 5. Preparation of Protective Film

A PET (polyethylene terephthalate) film (product name: SRF Film, thickness: 80 μm, manufacturer: Toyobo) (PET film (A), glass transition temperature: about 90° C.) was prepared as a protective film to be applied to the polarizing plate. The PET film (A) was heat-treated at a temperature condition of 90° C. to 100° C. for about 30 to 40 seconds to prepare a PET film (B), and the PET film (A) was heat-treated at a temperature condition of 100° C. to 110° C. for about 30 to 40 seconds to prepare a PET film (C).

The shrinkage force for each PET film was summarized in Table 1 below

TABLE 1

|  | MD Shrinkage force | TD Shrinkage force |
|---|---|---|
| PET(A) | 0~1N | 7~8N |
| PET(B) | 0~1N | 5~6N |
| PET(C) | 0~1N | 3~4N |

Example 1

A polarizing plate was produced in the following manner. First, using an epoxy-based ultraviolet curable adhesive (thickness: 2 μm to 3 μm), the PET film (A) (MD shrinkage force: 0 to 1N, TD shrinkage force: 7 to 8N, thickness: 80 μm) of Production Example was attached to one side of the PVA polarizing film (MD shrinkage force: 8 to 10 N, thickness: 17 μm) produced in Production Example 1. Upon the attachment, the TD direction of the PET film and the MD direction (absorption axis direction) of the PVA polarizing film were attached so as to be substantially perpendicular to each other. Subsequently, a hard coating layer was formed to a thickness of about 5 to 7 μm using a material containing an epoxy compound and an oxetane compound on the surface of the PVA polarizing film to which the PET film was not attached. Thereafter, an acrylic pressure-sensitive adhesive layer having a thickness of about 25 μm was formed on the lower part of the hard coating layer to produce a polarizing plate.

As a result of obtaining the A value of Equation 1 above for the produced polarizing plate, it was about 4.02 Nmm to 6.55 Nmm.

The lower limit of the A value range was obtained by applying 0.78 as a and 0.25 mm (=applied LCD panel thickness (mm)/2) as b in Equation 1, applying about 9 N as $S_{PVA}$ and 7.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as $T_2$.

Furthermore, the upper limit of the range of the A value was obtained by applying 1.27 as a and 0.25 mm (=applied LCD panel thickness (mm)/2) as b in Equation 1, applying about 9 N as $S_{PVA}$ and 7.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as $T_2$.

Two polarizing plates produced in the above manner were each attached to upper and lower surfaces of a general 32 inch LCD (liquid crystal display) panel (thickness: about 500 μm) through the pressure-sensitive adhesive layer of the polarizing plate.

Figure 2:
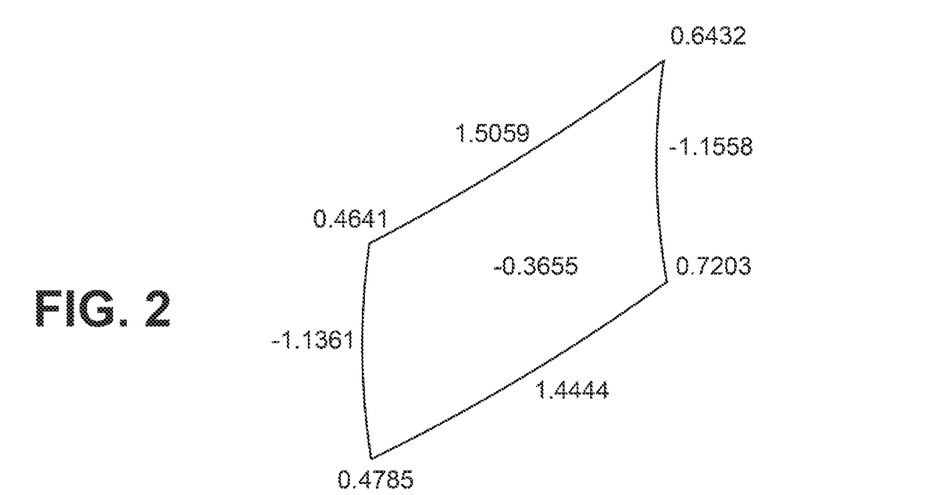
FIGS. 2 to 4 are views showing evaluation results of liquid crystal panels of Examples.

Subsequently, after the LCD panel was introduced into a chamber at a temperature of 60° C. for 72 hours, it was taken out, and the panel change amounts at the elapsed time of 2 hours and the elapsed time of 24 hours were measured and summarized in Table 3 below and the results were described in FIG. 2 (flatness after 24 hours). The term flatness in Table 3 below is a difference between the portion of the liquid crystal panel that is most bent toward the upper polarizing plate and the portion of the liquid crystal panel that is most bent toward the lower polarizing plate, and this flatness can be confirmed using a known three-dimensional measuring machine (Dukin Co., Ltd.).

Example 2

A polarizing plate was produced in the same manner as the production of the upper polarizing plate in Example 1, except that a PVA polarizing film (MD shrinkage force: 8 to 10 N, thickness: 17 μm) was used as the polarizing film and the PET film (B) (MD shrinkage force: 0 to 1N, TD shrinkage force: 5 to 6 N, thickness: 80 μm) was used as the PET film.

As a result of obtaining the A value of Equation 1 above for the produced polarizing plate, it was about 3.85 Nmm to 5.23 Nmm.

The lower limit of the A value range was obtained by applying 0.86 as a and 0.25 mm (=applied LCD panel thickness (mm)/2) as b in Equation 1, applying about 9 N as $S_{PVA}$ and 5.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as $T_2$.

Furthermore, the upper limit of the range of the A value was obtained by applying 1.17 as a and 0.25 mm (=applied LCD panel thickness (mm)/2) as b in Equation 1, applying about 9 N as $S_{PVA}$ and 5.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2.

Two polarizing plates produced in the above manner were each attached to upper and lower surfaces of a general 32 inch LCD (liquid crystal display) panel (thickness: about 500 μm) through the pressure-sensitive adhesive layer of the polarizing plate.

Figure 3:
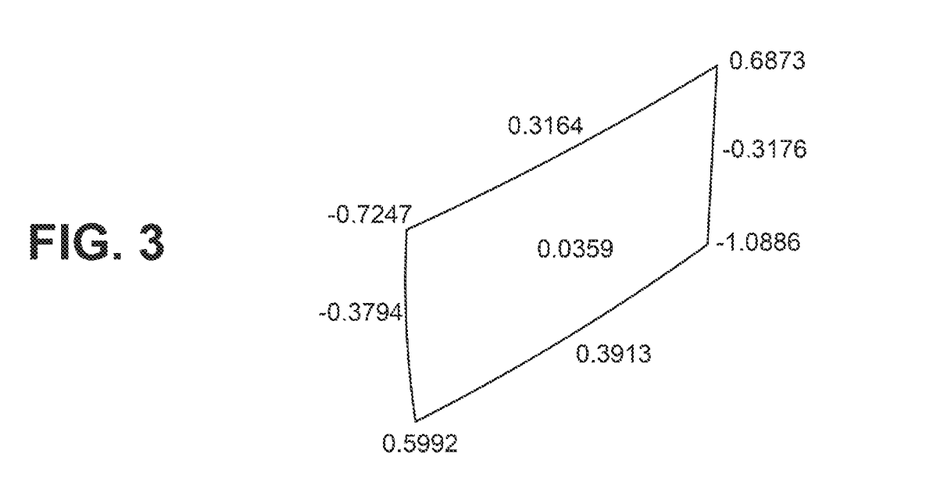

Subsequently, after the LCD panel was introduced into a chamber at a temperature of 60° C. for 72 hours, it was taken out, and the panel change amounts at the elapsed time of 2 hours and the elapsed time of 24 hours were measured and summarized in Table 3 below and the results were described in FIG. 3 (flatness after 24 hours).

Example 3

A polarizing plate was produced in the same manner as the production of the upper polarizing plate in Example 1, except that a PVA polarizing film (MD shrinkage force: 8 to 10 N, thickness: 17 μm) was used as the polarizing film and the PET film (C) (MD shrinkage force: 0 to 1N, TD shrinkage force: 3 to 4 N, thickness: 80 μm) was used as the PET film.

As a result of obtaining the A value of Equation 1 above for the produced polarizing plate, it was about 2.43 Nmm to 5.89 Nmm.

The lower limit of the A value range was obtained by applying 0.64 as a and 0.25 mm (=applied LCD panel thickness (mm)/2) as b in Equation 1, applying about 9 N as $S_{PVA}$ and 3.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2.

Furthermore, the upper limit of the range of the A value was obtained by applying 1.55 as a and 0.25 mm (=applied LCD panel thickness (mm)/2) as b in Equation 1, applying about 9 N as $S_{PVA}$ and 3.5N as $S_{Pro}$, and applying 0.0395 mm (=pressure-sensitive adhesive thickness (25 μm)+hard coating layer thickness (6 μm)+polarizing film thickness (17 μm)/2) as T1 and 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2.

Two polarizing plates produced in the above manner were each attached to upper and lower surfaces of a general 32 inch LCD (liquid crystal display) panel (thickness: about 500 μm) through the pressure-sensitive adhesive layer of the polarizing plate.

Figure 4:
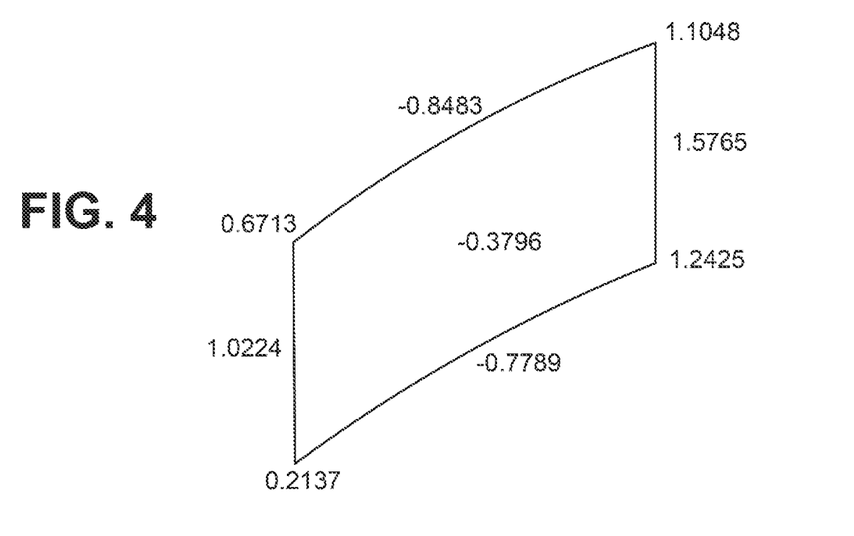

Subsequently, after the LCD panel was introduced into a chamber at a temperature of 60° C. for 72 hours, it was taken out, and the panel change amounts at the elapsed time of 2 hours and the elapsed time of 24 hours were measured and summarized in Table 3 below and the results were described in FIG. 4 (flatness after 24 hours).

TABLE 2

| | At first | After 2 hours | | After 6 hours | |
|---|---|---|---|---|---|
| | Flatness | Flatness | Change amount | Flatness | Change amount |
| Example 1 | 1.5 | 2.8 | 1.3 | 2.7 | 1.2 |
| Example 2 | 2.2 | 2.0 | 0.2 | 1.8 | 0.4 |
| Example 3 | 1.0 | −2.7 | −3.7 | −2.7 | −3.7 |

11: protective film
12: polarizing film
13: pressure-sensitive adhesive layer

The invention claimed is:

1. A polarizing plate comprising
a polarizing film in which a light absorption axis is formed in one in-plane direction;
a protective film formed on one side of the polarizing film;
and a pressure-sensitive adhesive layer formed on the other side of the polarizing film,
wherein the total thickness is 200 μm or less,
a ratio of ($S_{Pro}/S_{PVA}$) of a shrinkage force ($S_{PVA}$) of the polarizing film in the in-plane direction parallel to the light absorption axis direction and a shrinkage force ($S_{Pro}$) of the protective film in the in-plane direction perpendicular to the light absorption axis direction is in a range of 0.1 to 5; and
a ratio ($S/S_{Pro}$) of the shrinkage force ($S_{Pro}$) of the protective film in the in-plane direction perpendicular to the light absorption axis direction of the polarizing film and the shrinkage force (S) of the protective film in the in-plane direction parallel to the light absorption axis direction of the polarizing film is in a range of 2 to 20.

2. The polarizing plate according to claim 1, wherein the ratio ($S/S_{Pro}$) of the shrinkage force ($S_{Pro}$) of the protective film in the in-plane direction perpendicular to the light absorption axis direction of the polarizing film and the shrinkage force (S) of the protective film in the in-plane direction parallel to the light absorption axis direction of the polarizing film is in a range of 8 to 20.

3. The polarizing plate according to claim 1, wherein the shrinkage force ($S_{PVA}$) of the polarizing film in the light absorption axis direction is in a range of 0.1 N to 15 N.

4. The polarizing plate according to claim 1, wherein the protective film is a polyester film.

5. The polarizing plate according to claim 1, wherein the thickness of the polarizing film is in a range of from 5 μm to 25 μm.

6. The polarizing plate according to claim 1, wherein the thickness of the protective film is in a range of 20 82 m to 250 μm.

7. The polarizing plate according to claim 1, wherein the thickness of the pressure-sensitive adhesive layer is in a range of 5 μm to 100 μm.

8. The polarizing plate according to claim 1, further comprising an adhesive layer between the protective film and the polarizing film.

9. The polarizing plate according to claim 8, wherein the adhesive layer has a thickness in a range of 2 μm to 4 μm.

10. The polarizing plate according to claim 1, further comprising a cured resin layer between the polarizing film and the pressure-sensitive adhesive layer.

11. The polarizing plate according to claim 10, wherein the cured resin layer has a thickness in a range of 4 μm to 10 μm.

12. A display device comprising the polarizing plate of claim 1.

13. A polarizing plate comprising
- a polarizing film in which a light absorption axis is formed in one in-plane direction;
- a protective film formed on one side of the polarizing film; and
- a pressure-sensitive adhesive layer formed on the other side of the polarizing film,
- wherein the total thickness is 200 μm or less,
- wherein a ratio of ($S_{Pro}/S_{PVA}$) of a shrinkage force ($S_{PVA}$) of the polarizing film in the in-plane direction parallel to the light absorption axis direction and a shrinkage force ($S_{Pro}$) of the protective film in the in-plane direction perpendicular to the light absorption axis direction is in a range of 0.1 to 5, and
- wherein the protective film has a ratio ($S/S_{Pro}$) of a shrinkage force ($S_{Pro}$) of the protective film in the in-plane direction perpendicular to the light absorption axis direction of the polarizing film and a shrinkage force (S) of the protective film in the in-plane direction parallel to the light absorption axis direction of the polarizing film is in a range of 2 to 20
- wherein an A value in Equation 1 is in a range of 0.01 to 26 N·mm:

$$A = a \times (S_{PVA} \times (T_1 + b) + S_{Pro} \times (T_2 + b)) \quad \text{[Equation 1]}$$

wherein, in Equation 1, $S_{PVA}$ is the shrinkage force of the polarizing film in the light absorption axis direction, $S_{Pro}$ is a large shrinkage force among a shrinkage force of the protective film in the direction parallel to the light absorption axis direction of the polarizing film and a shrinkage force of the protective film in the direction perpendicular to the light absorption direction, $T_1$ is a distance (unit:mm) from the lowermost portion of the pressure-sensitive adhesive layer to the center of the polarizing film, $T_2$ is a distance (unit:mm) from the lowermost portion of the pressure-sensitive adhesive layer to the center of the protective film, a is a number within a range of 0.5 to 2, and b is a number within a range of 0.14 to 0.6.

* * * * *